US010792972B2

(12) United States Patent
Sinkular et al.

(10) Patent No.: US 10,792,972 B2
(45) Date of Patent: Oct. 6, 2020

(54) HEATING AND COOLING SYSTEM FOR A VEHICLE INCLUDING A THERMOPHYSICAL BATTERY

(71) Applicants: Jasmin Jijina Sinkular, Bloomfield Hills, MI (US); Frank Horton, Rochester Hills, MI (US); Hussein Dourra, Bloomfield, MI (US)

(72) Inventors: Jasmin Jijina Sinkular, Bloomfield Hills, MI (US); Frank Horton, Rochester Hills, MI (US); Hussein Dourra, Bloomfield, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 182 days.

(21) Appl. No.: 16/149,783

(22) Filed: Oct. 2, 2018

(65) Prior Publication Data
US 2019/0100075 A1 Apr. 4, 2019

Related U.S. Application Data

(60) Provisional application No. 62/566,735, filed on Oct. 2, 2017.

(51) Int. Cl.
*B60H 1/00* (2006.01)
*B60H 1/06* (2006.01)
(Continued)

(52) U.S. Cl.
CPC ..... *B60H 1/00492* (2013.01); *B60H 1/00321* (2013.01); *B60H 1/00342* (2013.01);
(Continued)

(58) Field of Classification Search
CPC ............ B60H 1/00492; B60H 1/00321; B60H 1/00342; B60H 1/00571; B60H 1/00792;
(Continued)

(56) References Cited

U.S. PATENT DOCUMENTS 6,394,210 B2 * 5/2002 Matsuda ............ B60H 1/00278
180/68.1
7,975,757 B2 * 7/2011 Nemesh ............ B60H 1/00278
165/42

(Continued)

OTHER PUBLICATIONS

Shankar Narayanan et al, A thermophysical battery for storage-based climate control, Applied Energy, Mar. 1, 2017, 31-43, vol. 189, Elsevier.

(Continued)

Primary Examiner — Jon T. Schermerhorn, Jr.
(74) Attorney, Agent, or Firm — Dickinson Wright PLLC

(57) ABSTRACT

A heating and cooling system for a vehicle included within a radiator module having a plurality of fins. At least two thermophysical batteries are provided, each including an adsorption bed unit and an evaporator condenser unit. At least one upper coolant line extends along the adsorption bed unit of each of the thermophysical batteries and is configured to be connected to a source of waste heat of the vehicle for transferring heat from the source of waste heat to a coolant contained in the coolant line and to the adsorption bed units to recharge the adsorption bed unit. At least one distribution element configured in discharge mode to convey heated fluids from adjacent the adsorption bed units or cooled fluids from adjacent to the evaporator condenser units to another region of the vehicle.

20 Claims, 2 Drawing Sheets

(51) Int. Cl.
  *F28D 20/00* (2006.01)
  *F28D 20/02* (2006.01)
  *B60H 1/32* (2006.01)
  *F28D 21/00* (2006.01)

(52) U.S. Cl.
  CPC ..... *B60H 1/00571* (2013.01); *B60H 1/00792* (2013.01); *B60H 1/00885* (2013.01); *B60H 1/06* (2013.01); *F28D 20/003* (2013.01); *F28D 20/028* (2013.01); *B60H 1/3227* (2013.01); *F28D 2021/008* (2013.01)

(58) Field of Classification Search
  CPC .... B60H 1/00885; B60H 1/06; B60H 1/3227; F28D 20/003; F28D 20/028; F28D 2021/008
  See application file for complete search history.

(56) References Cited

U.S. PATENT DOCUMENTS

| | | | |
|---|---|---|---|
| 8,753,762 B2 * | 6/2014 | Major | B60H 1/00278 |
| | | | 429/120 |
| 2017/0152957 A1 * | 6/2017 | Roche | H01M 10/6568 |
| 2019/0165438 A1 * | 5/2019 | Kim | H01M 10/625 |
| 2019/0176571 A1 * | 6/2019 | Oh | B60L 58/27 |

OTHER PUBLICATIONS

Shankar Narayanan et al, Thermal battery for portable climate control, Applied Energy, Jul. 1, 2015, 104-116, vol. 149, Elsevier.
Shankar Narayanan et al, Optimization of adsorption processes for climate control and thermal energy storage, Oct. 2014, 288-300, vol. 77, Elsevier.

* cited by examiner

HEATING AND COOLING SYSTEM FOR A VEHICLE INCLUDING A THERMOPHYSICAL BATTERY

CROSS-REFERENCE TO RELATED APPLICATION

This U.S. patent application claims the benefit of U.S. Provisional Patent Application Ser. No. 62/566,735 filed Oct. 2, 2017, entitled "Heating and Cooling System For a Vehicle Including a Thermophysical Battery," the entire disclosure of the application being considered part of the disclosure of this application and hereby incorporated by reference.

TECHNICAL FIELD

A heating and cooling system for a vehicle. More particularly, a heating and cooling system for a vehicle that includes one or more thermophysical batteries that store thermal energy generated by vehicle waste heat sources, a power grid and/or standard in-vehicle energy sources. The thermophysical batteries are configured to provide heated or cooled air or coolant to various parts of the vehicle.

BACKGROUND OF THE DISCLOSURE

Heating and cooling systems are known in the art for controlling the temperature of regions of vehicles, such as the cabin, an engine oil system, and a transmission oil system. Typically a significant amount of waste heat is generated by components of the vehicles such as an internal combustion engine or electric motor. Such waste heat is expelled into the atmosphere. Accordingly, there remains a need for improvements to conventional heating and cooling systems to utilize the waste heat more efficiently to manage the temperature of different regions of the vehicle.

SUMMARY OF THE INVENTION

A heating and cooling system for a vehicle including a radiator having a plurality of fins. At least two thermophysical batteries that are adapted to simultaneously charge and discharge are provided, each including an adsorption bed unit and an evaporator condenser unit. At least one upper coolant line extends along the adsorption bed unit of each of the thermophysical batteries and is configured to be connected to a source of waste heat of the vehicle for transferring heat from the source of waste heat to a coolant contained in the coolant line and to the adsorption bed units to recharge the adsorption bed unit. At least one distribution element is configured to convey heated fluids from adjacent to the adsorption bed units or cooled fluids from adjacent to the evaporator condenser units to another region of the vehicle. The other region of the vehicle that may be heated or cooled may include, but are not limited to, the vehicle cabin, an engine oil system, a transmission oil system, various batteries, and cabin seating.

The invention in its broadest aspect therefore utilizes heat from the sources of waste heat of the vehicle to charge the thermophysical battery to provide cooling and heating of another region or module of the vehicle. Accordingly, waste heat that otherwise would be expelled to the atmosphere is utilized to more efficiently operate the vehicle. Furthermore, the claimed heating and cooling system is packaged in a compact, efficient manner, including all the required valves and sensors, such that it is easy and inexpensive to manufacture and occupies very little space in the vehicle. Additionally, the invention integrates radiator modules and thermophysical batteries in order to share their expensive sub-components which serve similar sub-functions. This minimizes the space, cost and weight needed for these functions.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a heating and cooling system 20, 120 for a vehicle is generally shown. It should be appreciated that the subject heating and cooling system 20, 120 may be utilized on various vehicles including, but not limited to, automobiles and recreational vehicles. It should also be appreciated that the subject system may be utilized for different vehicle architectures, e.g., Battery Electric Vehicle (BEV), Plug-in Hybrid Electric Vehicle (PHEV), Internal Combustion Engine (ICE) based vehicles, etc.

Figure 1:
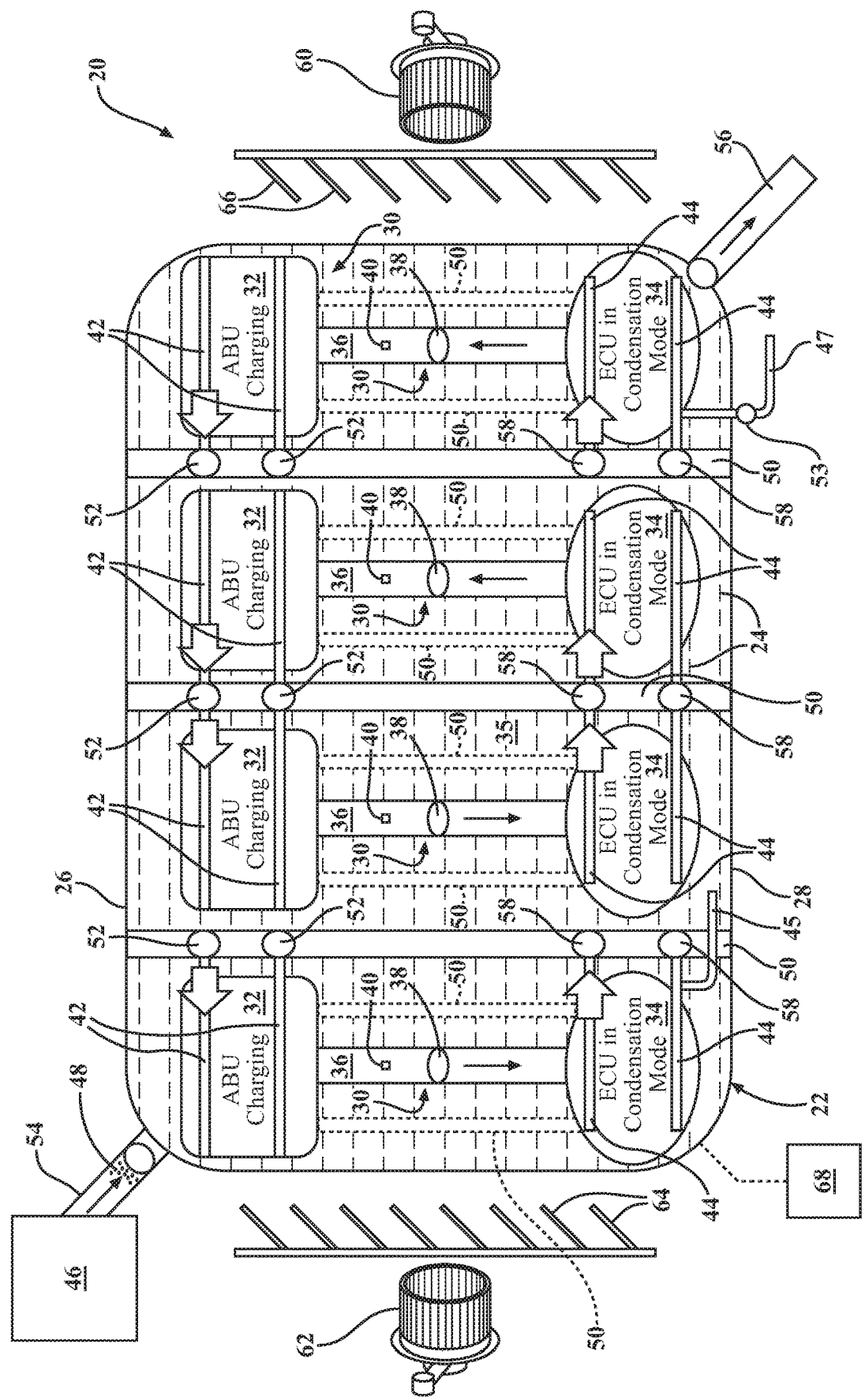
FIG. 1 is a side schematic view of a first example embodiment of a heating and cooling system for a vehicle that utilizes a plurality of thermophysical batteries.

With reference to FIG. 1, according to a first embodiment of the subject heating and cooling system 20, the heating and cooling system 20 includes a radiator 22 that has a plurality of fins 24 and presents a top surface 26 and a bottom surface 28. A plurality of thermophysical batteries 30 are positioned between the fins 24 of the radiator 22.

Each of the thermophysical batteries 30 includes an adsorption bed unit (ABU 32) and an evaporator condenser unit (ECU 34). The ABUs 32 are aligned with one another adjacent to the top surface 26 of the radiator 22 and the ECUs 34 are aligned with one another adjacent to the bottom surface 28 of the radiator 22. The distance between the ABUs 32 and ECUs 34, and thermal insulation 35 disposed therebetween, thermally isolates the ABUs 32 and ECUs 34 from one another. An intermediate tube 36 fluidly connects the respective ABU 32 and the ECU 34 of each of the thermophysical batteries 30 to allow the passage of refrigerant vapor between the ABU 32 and ECU 34. An intermediate valve 38 is positioned along each of the intermediate tubes 36 for opening and closing the intermediate tube 36. The intermediate valve 38 controls the rate of flow of refrigerant fluid between the ABU 32 and ECU 34, thus controlling the rate of discharge of the thermophysical battery 30 and therefore the thermal management of the vehicle. It should be appreciated that the intermediate valve 38 is configured to selectively provide various flow rates between open and closed positions of the intermediate valve 38 as required. At least one sensor 40 is positioned in the intermediate tube 36. It should be appreciated that any number of sensors 40 may be used, and various types of sensors may be utilized including, but not limited to, a flow rate sensor for monitoring the flow rate of refrigerant vapor that passes between the ABU 32 and ECU 34, a temperature sensor or a pressure sensor. The intermediate valves 38 and sensors 40 are electrically connected to a control system to allow automated or manual control of the intermediate valves 38.

In a discharge mode, the ABUs 32 act as hot terminals for the purpose of heating regions or modules of the vehicle, and the ECUs 34 act as cold terminals for the purpose of cooling regions or modules of the vehicle. More particularly, each ABU 32 is configured to undergo an adsorption (discharging) process which causes heat to be transferred away from the ABU 32 to provide a heating effect, and a desorption processes which recharges the ABU 32. Each ECU 34 is configured to undergo an evaporation (discharging) process which pulls heat from the surroundings of the ECU 34 to provide a cooling effect, and a condensation processes which recharges the ECU 32. The rate at which the charging and discharging processes of the ABU 32 and ECU 34 are executed may be varied by opening and closing the intermediate valve 38 to different extents to selectively allow and prevent the flow of refrigerant vapor molecules between the ABU 32 and ECU 34. The rate of charging of the ABU 32 is also controlled by the rate at which heat is provided to the ABU 32 in the charge mode. When the ABU 32 is in a charged state, it may be discharged by opening the intermediate valve 38 to allow the transport of refrigerant vapor from the charged ECU 34 to the ABU 32. Conversely, thermal energy is successfully stored, for an indefinite length of time, in a fully charged thermophysical battery 30 if the intermediate valve 38 between the ABU 32 and ECU 34 remains tightly sealed. It should be appreciated that any number of ABUs 32 may be charged or charging at the same time as one another. In other words, the thermophysical batteries 30 may be configured to charge and discharge in unison with one another or at different times depending on specific needs.

During discharge of the thermophysical battery 30, heat is supplied to the ECU 34 that matches an enthalpy of evaporation, and heat is released at the ABU 32 which matches an enthalpy of adsorption. This allows refrigerant molecules to pass from the vapor-rich ECU 34 to the vapor-deficient ABU 32. The ABU 32 may then be recharged by supplying heat to the ABU 32, which results in vapor desorption and its passage back to the ECU 34. The vapor entering the ECU 34 condenses by releasing the heat of condensation. As such, during the recharging process, the ABU 32 and ECU 34 undergo transitions which last until the ABU 32 is evacuated and the ECU 34 is replenished, thereby bringing the thermophysical battery 30 back to its initial charged state. It should be appreciated that this thermodynamic cycle can recur any number of times over the lifetime of the vehicle/thermophysical batteries 30, and under a variety of ambient, automotive conditions.

In order to provide heat to the ABUs 32 in the charging mode, and to the ECU 34 and away from the ABU 32 in the discharging mode, and to the radiator fins 24 in a radiator mode, or to a lesser extent in any mode, a plurality of coolant lines 42, 44, 45 extend through the thermophysical batteries 30. The coolant lines 42, 44, 45 are also connected to a source of waste heat 46 of the automobile. The source of waste heat 46 may include various sources of waste heat including, but not limited to, an internal combustion engine, an electric motor, an electric battery and a solar thermal sink. A coolant 48 is disposed in the coolant lines 42, 44, 45 which receives heat from the source of waste heat 46 as it passes therethrough. The plurality of coolant lines 42, 44, 45 includes a plurality of upper coolant lines 42 that pass through the ABUs 32 and a plurality of lower coolant lines 44 that pass through the ECUs 34. The upper and lower coolant lines 42, 44 are fluidly connected to one another with a plurality of connecting lines 50 and upper and lower valves 52, 58 to selectively run coolant through some lines but not others. The coolant lines 42, 44, 45 also include a plurality of fin coolant lines 45 that extend along/adjacent to the fins 24 to carry coolant to the fins 24 to dissipate heat into the atmosphere while the system 20 is in the radiator mode. The coolant lines 42, 44, 45 may be selectively reused for various mutually exclusive functions, e.g., carrying heat to the ABU 32 in a charge mode, carrying heat away from the ABU 32 in a discharge mode, carrying heat to the ECU 34 in the discharge mode, or simply carrying heat to be radiated away at the radiator fins 24 in the radiator mode, or to a lesser extent, in any other mode. This reuse of coolant lines 42, 44 from a traditional radiator, which are typically the most expensive portion of a thermophysical battery, for various mutually exclusive functions in different modes, serves to make the thermophysical battery 30 more affordable in cost, weight and packaging space.

According to a further aspect of the disclosure, the coolant lines 42, 44, 45 include an auxiliary outlet 47 that is connected to another portion of the vehicle, such as a conventional thermal circuit of the vehicle or other systems associated with the engine or transmission. Accordingly, the auxiliary outlet 47 acts as a distribution element which allows the coolant lines 42, 44, 45 to provide heating or cooling from the thermophysical batteries 30 to the other portions of the vehicle, such as by way of the conventional thermal circuit of the vehicle or other engine or transmission systems of the vehicle to heat vehicle systems such as engine and/or transmission fluid. Another manner in which the subject system is configured to distribute thermal energy to other parts of the vehicle, such as for cabin heating/cooling, includes blowing air against and past the ABU 32 for heating, or ECU 34 cooling, and toward a target area of the vehicle through ducts.

An inlet line 54 is fluidly connected to the plurality of upper coolant lines 42 and to the source of waste heat 46 in the vehicle for passing the coolant 48 to the plurality of coolant lines 42, 44, 50. Similarly, an outlet line 56 is fluidly connected to the plurality of lower coolant lines 44 for passing coolant from the lower coolant lines 44 away from the thermophysical batteries 30. It should be appreciated that the inlet line 54 and outline line 56 could alternatively be connected to any of the other coolant lines 42, 44, 50.

A plurality of upper valves 52 are positioned in the upper coolant lines 42 between the ABUs 32 for selectively allowing the coolant 48 to be passed between the ABUs 32. More particularly, the upper valves 52 allow the coolant to pass to the charging ABU 32, from the discharging ABU 32, or to bypass the ABU 32 to flow directly to the radiator fins 24 if the thermophysical battery 30 is in charge mode and it is already fully charged. A plurality of lower valves 58 are positioned along the lower coolant lines 44 between the ECUs 34 for selectively allowing the flow of coolant 48 to the ECUs 34 in discharge mode, away from the ECU 34 in charge mode, or to bypass the ECU 34 and flow directly to the radiator fins 24 if the thermophysical battery 30 is in charge mode and it is already fully charged. Additionally, an auxiliary valve 53 is provided to open and close the auxiliary outlet 47. The upper, lower and auxiliary valves 52, 58, 53 are electrically connected to the control system 68 to allow the upper lower and auxiliary valves 52, 58, 53 to selectively be positioned in an open position, a closed positioned and various other intermediate positions to provide a desired flow rate through the upper, lower and auxiliary valves 52, 58, 53 in various arrangements to provide a desired effect.

The vehicle includes a front side blower 60 and a cabin side blower 62. A plurality of front side ducts and vents 66 are disposed adjacent to the front side blower 60, and a plurality of cabin side ducts and vents 64 are disposed adjacent to the cabin side blower 62. The blowers 60, 62 and ducts and vents 64, 66 act as distribution elements for conveying heated or cooled air from the thermophysical batteries 30 to other regions of the vehicle. More particularly, the cabin side blower 62 may be set to a blower mode for directing heated or cooled air away from a region of the radiator 22 adjacent or from one or more ABUs 32 or ECUs 34 of the thermophysical batteries 30 that are charging or fully charged, and therefore in need of being efficiently expelled away to the atmosphere. Alternatively, the cabin side blower 62 may be set on a vacuum mode to draw air from adjacent to one or more of the ABUs 32 and ECUs 34 into the cabin. The position of the ducts and vents 64 may be varied to direct the heated or cooled air to other desired locations to provide other heating or cooling effects. Similarly, a plurality of front side ducts and vents 66 are disposed adjacent to the front side blower 60. The front side blower 60 may be set to a vacuum mode for directing air away from a region of the radiator 22 adjacent or from one or more ABUs 32 or ECUs 34 of the thermophysical batteries 30 that are charging or fully charged, and therefore in need of being efficiently expelled away to the atmosphere. Additionally, the front side blower 60 may be set to a blower mode for directing heated or cooled air from adjacent to one or more of the ABUs 32 and ECUs 34 into the cabin. The position of the front side ducts and vents 66 may be varied to direct the heated or cooled air to other desired locations to provide other heating or cooling effects. The controller 68 is further electrically connected to the cabin side blower 62, the front side blower 60, the cabin side ducts and vents 64 and the front side ducts and vents 66 to provide selective airflow toward and away from the thermophysical batteries 30.

During the charging operation of the thermophysical batteries 30, hot coolant 48 passes from the source of waste heat 46, through the heating lines 42, 44, 50 and to one or more of the ABUs 32 that are set to be in charging mode. The coolant 48 is at a temperature that is sufficient for adsorption in the ABUs 32, thus providing a charging effect for the ABUs 32. The intermediate valve 38 is opened, and refrigerant vapor is desorbed from the ABUs 32 and passes to the ECUs 34 through the intermediate tube 36. The one or more sensors 40 monitor refrigerant vapor flow as the refrigerant passes from the ABUs 32 to the ECUs 34. The refrigerant vapor condenses in the ECU 34 and generates heat. The heat generated by the ECU 34 is passed to the coolant 48 in the coolant lines 42, 44 and mixes into the primary coolant channels of the radiator 22 and is radiated away via the conventional radiator 22 function. If the coolant 48 leaving the ECUs 34 is of sufficiently high temperature, then the upper and lower valves 52, 58 may be opened such that the coolant 48 recirculates back to the ABUs 32 to aid in charging the ABUs 32. After the ABUs 32 absorb heat from the coolant 48, cooled coolant 48 may flow from the ABUs 32 to the ECUs 34. If the heat being produced by the source of waste heat 40 is in excess of what is being utilized by the ABUs 32 for charging, the cabin side blower 62 may be turned to the blower mode, and the front side blower 60 may be turned to the vacuum mode to draw air from the radiator 22 to aid in the conventional function of the radiator 22. Alternatively, if cabin heat is needed, thermal energy in the discharging ABUs 32 can be conserved, and instead heat brought in by the coolant 48 from the source of waste heat 40 may be utilized. In this case, the cabin side blowers 62 can operate in the vacuum mode and the front side blower 60 can operate in the blower mode. The direction of the blowers 60, 62 can be reversed as necessary, dictated by the dynamic thermal balance within the cabin.

When the recharging process is complete for an ABU 32 within the current charging segment, the intermediate valve 38 between the ABU 32 and ECU 34 pair is sealed in order to thermophysically isolate the ABU 32 and ECU 34 from one another for purposes of thermal energy storage without loss. Furthermore, the upper and lower valves 52, 58 are closed to prevent thermal transport to and from the fully charged ABU 32 and ECU 34 pair. In this situation, hot coolant 48 continues to flow through the primary coolant lines of the automobile to fulfill the radiator 22 cooling function. The cabin side blower 62 operates in the blower mode and the front side blower 60 operates in the vacuum mode as needed to radiate away excessive waste heat energy brought into the thermophysical battery 30 from the source of waste heat 46 into the atmosphere. If cabin heat is needed, thermal energy in the discharging ABU 32 can be conserved instead of using heat brought in by the coolant 48 from the source of waste heat 46. In this case, the cabin side blower 62 is used in the vacuum mode and the front side blower 60 operates in the blower mode. The direction of the blowers 60, 62 can be reversed as necessary, dictated by the dynamic thermal balance within the cabin. Desiccant can be used in the path of the heat/cool flow into the cabin to dry that air as needed.

While the one or more ABUs 32 are discharging, the intermediate valve 38 is opened and an evaporation mode of the ECU 34 is triggered, whereby refrigerant vapors are created and channeled via the open intermediate valve 38 to the ABU 32 to initiate discharge. In the discharge mode, the ABU 32 releases heat which, in a cabin heating mode is carried away by the coolant 48 and can be directed into the cabin by using the cabin side blower 62 in the vacuum mode and the front side blower 60 in the blower mode. Desiccant can be used in the path of the heated or cooled flow into the cabin to dry the air as needed. In a cabin cooling mode, hot air from the cabin can be circulated to the ECU 34, and the cooled air recirculated into the cabin. As necessary, thermal energy in the radiator coolant can provide heat to the ECU 34 during discharge. Excess heat in all cases is radiated away to the ambient by using the cabin side blower 62 in blower mode and front side blower 60 in vacuum mode. The refrigerant vapor passing through the intermediate valve 38 can be constantly adjusted to control the flow of the refrigerant vapor to the ABU 32, hence the rate of adsorption and therefore rate of heating and cooling.

In the process of switching between charge and discharge modes, a plurality of thermophysical batteries 30 may be utilized such that two or more ABUs 32 are integrated adjacent to the top side 26 of the radiator 22 and separated into two segments (as illustrated in FIG. 1). According to this embodiment, one of the ABUs 32 is charged via the source of waste heat 46. Once fully charged, this ABU 32 can be thermally isolated by way of the upper valves 52, and the lower valves 58, and the adjacent region of the thermophysical battery 30 may be used to radiate excess heat to the ambient surroundings. Alternatively, one of the ABUs 32 can be discharged into the cabin heating or cabin cooling mode, while the ABU 32 charges, as illustrated above. The rate of discharge may be metered via the sensor 40 such that the rate of charging of the other ABU 32 may be matched therewith. This ensures that at any point in time, waste heat is always being used to charge one of the segments. It should be appreciated that the intermediate valve 38 may continuously be altered. Once the discharging ABU 32 is fully discharged or it falls below a certain performance threshold, the role of the two ABUs 32 is reversed, i.e., the charging/charged ABU 32 starts to discharge, and the discharged ABU 32 starts to recharge. The charging/discharging ABUs 32 are thermally isolated from each other and their respective ECUs 34. Similarly, one ECU 34 is in the condensation mode while its corresponding ABU 32 is charging via desorption using the waste heat source. Meanwhile, one ECU 34 is in the evaporation mode while its corresponding ABU 32 is discharging via adsorption for purposes of cabin heating or cabin cooling. When any given ABU 32 switches roles from charge to discharge, so does its corresponding ECU 34.

Figure 2A:
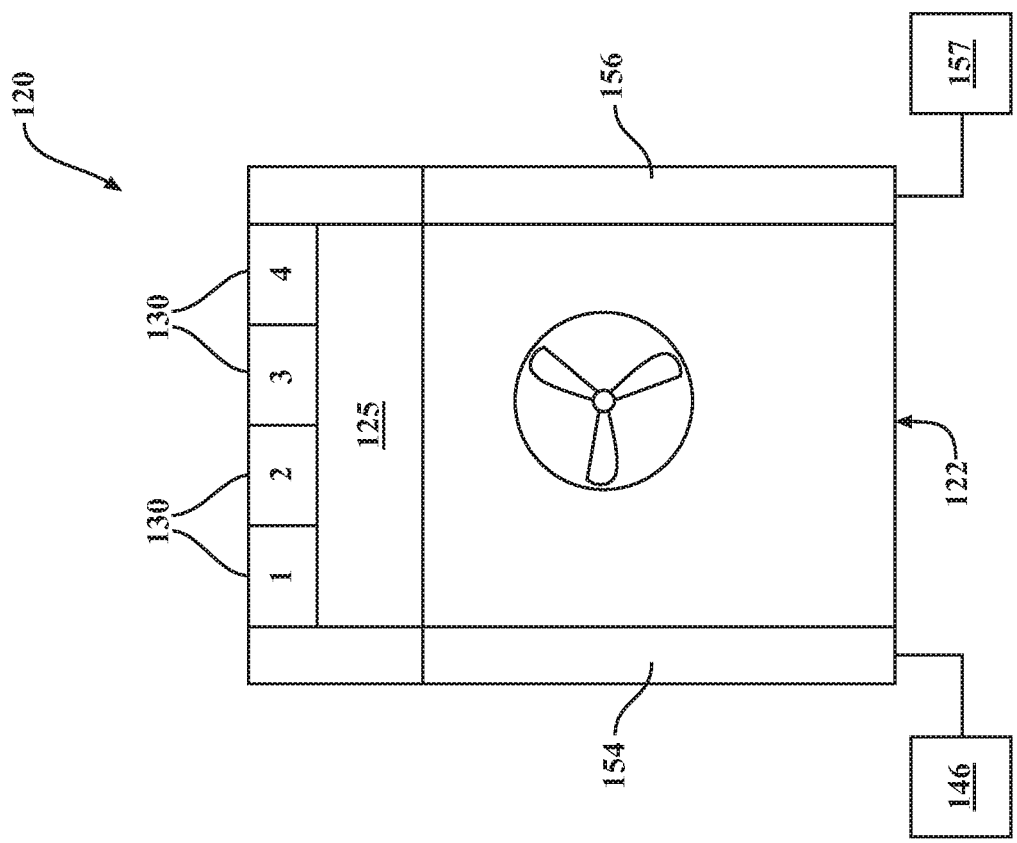
FIG. 2A is a side schematic view of a second example embodiment of a heating and cooling system for a vehicle that utilizes a plurality of thermophysical batteries.
Figure 2B:
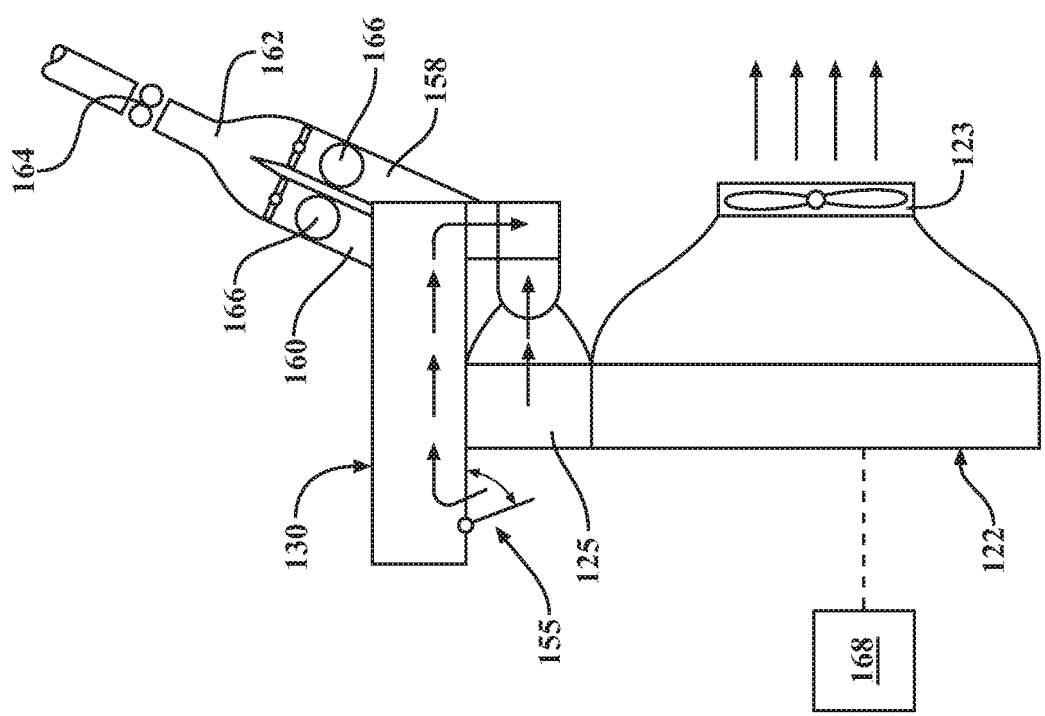
FIG. 2B is a rear schematic view of the second example embodiment of the heating and cooling system for a vehicle that utilizes a plurality of thermophysical batteries.

According to another aspect of the disclosure best illustrated in FIGS. 2A-2B, a second exemplary embodiment of the subject heating and cooling system 120 is provided. As illustrated, the heating and cooling system 120 includes a radiator 122. The radiator 122 includes a radiator fan 123 for directing air away from the radiator 122. A condenser 125 is disposed on top of the radiator 122. A plurality of thermophysical batteries 130 are disposed over the condenser 125. It should be appreciated that the thermophysical batteries 130 may be configured like the thermophysical batteries 130 of the first embodiment described above. A plurality of coolant lines 154, 156 pass through the thermophysical batteries 130. It should be appreciated that the coolant line connections between thermophysical batteries 130 may be selectively opened and closed relative to one another by way of a series of valves as described above. The plurality of coolant lines 154, 156 includes an inlet line 154 disposed adjacent to the radiator 122. The inlet line 154 may pass to the sources of waste heat 146 of the vehicle such that it may deliver heated coolant to the thermophysical batteries 130 to recharge the same. A flapper valve 155 is positioned along the inlet line 154 for selectively allowing coolant to pass to the thermophysical batteries 130. An outlet line 156 is disposed adjacent to the radiator 122 opposite the inlet line 154. The outlet line 156 may be fluidly connected to an outlet tank 157 for receiving excess heated coolant from the radiator 122. The outlet line 156 may pass to an outlet tank 157, through the radiator 122 and to the vehicles thermal management system or other specific system of the vehicle such as the engine.

One or more hot air ducts 158 pass adjacent to the ABUs of the thermophysical batteries 130 and the condenser 125. Furthermore, one or more cold air ducts 160 pass to the ECUs of the thermophysical batteries 130. The hot and cold air ducts 158, 160 meet at a central duct 162 that extends to the cabin of the vehicle. The hot and cold air ducts 158, 160 may be integral with shrouds of the thermophysical battery 130 or radiator 122. The shrouds may be one integral piece or separate from one another. A fan 164 is disposed in the central duct 162 to pass air to or from the hot and cold air ducts 158, 160 to the cabin of the vehicle. Butterfly valves 166 are disposed in the hot and cold air ducts 158, 160 for selectively opening and closing the hot and cold air ducts 158, 160 to the central duct 162 to selectively allow hot or cold air to pass from the thermophysical batteries 130 to the cabin of the vehicle. Accordingly, a single fan 164 may be utilized to blow the required amount of air to maintain a desired temperature and pressure in the cabin. It should be appreciated that an ambient duct may be fluidly connected to the hot, cold, or central ducts 158, 160, 162 to draw in ambient air from outside of the vehicle.

A controller 168 is electrically connected to the butterfly valves 166, radiator fan 123 and flapper valve 155 to provide selective control of the components. It should be appreciated that the controller 168 may be configured to contain embedded intelligence to control thermal energy flow across all vehicle modules and to/from energy sources and the ambient atmosphere as a function of time. More particularly, the controller 168 may be configured to precisely control the valves and blowers to dynamically orchestrate in coordinated fashion in order to maintain an optimal energy balance in the vehicle.

As briefly discussed in the above, it should be appreciated that additional coolant lines may be routed to other areas of the vehicle such that coolant produced by the source of waste heat 46, 146 may also be utilized for other purposes. For example, the coolant lines 42, 44, 45, 154, 156 may be routed to the engine or transmission of the vehicle to allow heated coolant to transfer heat to transmission and engine oil, which may provide advantages such as improved fuel economy when the vehicle is exposed to cold ambient temperatures. The coolant lines 42, 44, 45, 154, 156 may also be directed to batteries or seats of the vehicle to provide heating or cooling of the same. Similarly, it should also be appreciated that additional ducts may be provided to transfer hot or cold air that has been heated or cooled by the thermophysical batteries to other parts of the vehicle, e.g., seats, engine, batteries, to provide a heating or cooling effect. Accordingly, the subject heating and cooling system 20, 120 may advantageously be configured to share the function of coolant lines 42, 44, 45, 154, 156, blowers 60, 62 and radiant surfaces for conventional radiator functions, recharging the thermophysical batteries 30, 130 and for directing heated or cooled coolant and air from the charged thermophysical batteries 30, 130 to various destinations that need to be heated or cooled. The sharing of coolant lines 42, 44, 45, 154, 156 and air is accomplished by intelligent use of the various valves 38, 52, 53, 58, 155 and blowers 60, 62 to turn segments of the coolant lines 42, 44, 45, 154, 156 and ducts on and off, and to direct the flow of hot and cold coolant and air to transport the heat to an appropriate destination for various purposes. This provides reuse and sharing of components, thus reducing space, weight and costs. This is only viable because the functions of these various components are similar, hence they integrate into a radiator-like module. The radiator module could then be extended to a multipurpose module for various vehicle types and heat sources and may be utilized regardless of whether vehicle power is on or off.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A heating and cooling system for a vehicle including:
   a radiator having a plurality of fins;
   at least two thermophysical batteries that are adapted to simultaneous charge and discharge each other, each of the thermophysical batteries including an adsorption bed unit and an evaporator condenser unit;

at least one upper coolant line extending along the adsorption bed unit of each of the thermophysical batteries and configured to be connected to a source of waste heat of the vehicle for transferring heat from the source of waste heat to a coolant contained in the coolant line and to the adsorption bed units to recharge the adsorption bed unit; and at least one distribution element configured to convey heated fluids from adjacent the adsorption bed units or cooled fluids from adjacent to the evaporator condenser units to another region of the vehicle.

2. A heating and cooling system for a vehicle as set forth in claim 1 wherein the upper coolant line is further configured to carry heat away from the adsorption bed units while the adsorption bed units are in a discharge mode.

3. A heating and cooling system for a vehicle as set forth in claim 2 further including at least one lower coolant line extending across the evaporator condenser unit of each of the thermophysical batteries and configured to carry heat to the evaporator condenser units while the evaporator condenser units are in a discharge mode.

4. A heating and cooling system for a vehicle as set forth in claim 3 further including a fin coolant line extending adjacent to at least one of the radiator fins and fluidly connected to the upper and lower coolant lines for removing excess heat from the thermophysical battery.

5. A heating and cooling system for a vehicle as set forth in claim 4 wherein the upper coolant line, lower coolant line and radiator coolant line are fluidly connected to one another, and wherein at least one valve is configured to fluidly connect at least two of the upper coolant line, lower coolant line and radiator coolant line with one another to provide selective flow to different areas of the thermophysical batteries.

6. A heating and cooling system for a vehicle as set forth in claim 3 further including an outlet line fluidly connected to the lower coolant line for passing coolant from the lower coolant line away from the thermophysical batteries.

7. A heating and cooling system for a vehicle as set forth in claim 3 further including a plurality of lower valves positioned along the at least one lower coolant line between the evaporator condenser units for selectively allowing the flow of coolant between the evaporator condenser units.

8. A heating and cooling system for a vehicle as set forth in claim 1 further including an intermediate tube fluidly connecting the adsorption bed unit and evaporator condenser unit of each of the thermophysical batteries, and an intermediate valve disposed along each of the intermediate tubes selectively control the flow of refrigerant between the adsorption bed unit and evaporator condenser unit to control the rate of heating and cooling of the thermophysical batteries and for controlling the rate of charging and discharging of the thermophysical batteries.

9. A heating and cooling system as set forth in claim 8 further including at least one sensor positioned in the at least one intermediate tube for monitoring the rate of refrigerant that passes between the adsorption bed unit and evaporator condenser unit.

10. A heating and cooling system as set forth in claim 9 wherein the at least one sensor is at least one of a flow rate sensor, a temperature sensor or a pressure sensor.

11. A heating and cooling system as set forth in claim 9 further including a control system electrically connected to the intermediate valves and the at least one sensor and configured to control opening and closing of the intermediate valves.

12. A heating and cooling system as set forth in claim 11 further including an inlet line fluidly connected to the upper coolant lines and to the source of waste heat.

13. A heating and cooling system as set forth in claim 12 further including a flapper valve positioned along the inlet line for selectively allowing coolant to pass to the thermophysical batteries.

14. A heating and cooling system as set forth in claim 1 wherein the source of waste heat is an internal combustion engine.

15. A heating and cooling system as set forth in claim 1 further including a plurality of upper valves positioned in the at least one upper coolant line between the adsorption bed units for selectively allowing the coolant to be passed between the adsorption bed units.

16. A heating and cooling system as set forth in claim 1 further including a front side blower adjacent to the thermophysical batteries, at least one front side vent adjacent to the front side blower, and wherein the front side blower is configured to be set in a vacuum mode for directing air away from a region of the radiator adjacent to one or more of the thermophysical batteries and expelling the air into the atmosphere, and wherein the front side blower is also configured to be set in a blower mode for directing heated or cooled air from the region adjacent to one or more of the thermophysical batteries into a cabin of the vehicle.

17. A heating and cooling system as set forth in claim 1 further including a cabin side blower adjacent to the thermophysical batteries, at least one cabin side vent adjacent to the cabin side blower, and wherein the cabin side blower is configured to be set in a vacuum mode for directing air away from a region of the radiator adjacent to one or more of the thermophysical batteries and expelling the air into the atmosphere, and wherein the cabin side blower is also configured to be set in a blower mode for directing heated or cooled air from the region adjacent to one or more of the thermophysical batteries into a cabin of the vehicle.

18. A heating and cooling system as set forth in claim 1 wherein the radiator has a top side and a bottom side, and wherein the adsorption bed units are positioned adjacent to the top side of the radiator and wherein the evaporator condenser units are positioned adjacent to the bottom side of the radiator.

19. A heating and cooling system as set forth in claim 1 further including a condenser positioned against the radiator, and wherein the plurality of thermophysical batteries are positioned over the condenser.

20. A heating and cooling system as set forth in claim 1 further including at least one hot air duct passing adjacent to the adsorption bed units, at least one cold air passing adjacent to the evaporator condenser units, at least one fan configured to pass air from the hot and cold air ducts into the cabin of the vehicle, and at least one valve for selectively opening and closing the hot and cold air ducts.

* * * * *